(12) United States Patent
MacGillivray et al.

(10) Patent No.: US 9,818,096 B2
(45) Date of Patent: Nov. 14, 2017

(54) METHODS AND APPARATUS TO OBTAIN TRANSACTION CONFIRMATION

(71) Applicant: BlackBerry Limited, Waterloo (CA)

(72) Inventors: Geoffrey Wendell MacGillivray, Waterloo (CA); Vahid Moosavi, Kitchener (CA); David Ryan Walker, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 14/932,454

(22) Filed: Nov. 4, 2015

(65) Prior Publication Data

US 2016/0055471 A1    Feb. 25, 2016

Related U.S. Application Data

(63) Continuation of application No. 13/754,497, filed on Jan. 30, 2013, which is a continuation of application
(Continued)

(51) Int. Cl.
*G06Q 20/20*    (2012.01)
*G06Q 20/22*    (2012.01)
(Continued)

(52) U.S. Cl.
CPC ........... *G06Q 20/209* (2013.01); *G06Q 20/20* (2013.01); *G06Q 20/204* (2013.01);
(Continued)

(58) Field of Classification Search
CPC .... G06Q 20/204; G06Q 20/20; G06Q 20/322; G06Q 20/209
(Continued)

(56) References Cited

U.S. PATENT DOCUMENTS 8,666,895 B2 * 3/2014 Grigg .................... G06Q 20/20
235/380
2005/0222961 A1   10/2005 Staib et al.
(Continued)

FOREIGN PATENT DOCUMENTS

EP         2221984         8/2010
WO      2009039419         3/2009
(Continued)

OTHER PUBLICATIONS

Ziegler, Chris, Nokia teases Swipe NFC payment system for digital receipts, warm eco-friendly feeling, www.engadget.com, posted Sep. 13, 2010, 8 pages.
(Continued)

*Primary Examiner* — Vanel Frenel
(74) *Attorney, Agent, or Firm* — Fish & Richardson P.C.

(57) ABSTRACT

Methods and apparatus to obtain transaction confirmation are described. One example method includes emulating a payment method using a close-proximity communication device of a mobile device, establishing a close-proximity communication link using the close-proximity communication device of the mobile device, transferring payment information from the mobile device using the close-proximity communication device, switching the close-proximity communication device of the mobile device to an information receiving communication mode, and receiving a transaction confirmation at the close-proximity communication device of the mobile device. Other implementations are possible.

14 Claims, 7 Drawing Sheets

Related U.S. Application Data

No. 13/050,375, filed on Mar. 17, 2011, now Pat. No. 8,392,259.

(51) Int. Cl.
  *G06Q 20/32* (2012.01)
  *G06Q 20/42* (2012.01)
(52) U.S. Cl.
  CPC ......... *G06Q 20/223* (2013.01); *G06Q 20/322* (2013.01); *G06Q 20/3224* (2013.01); *G06Q 20/3278* (2013.01); *G06Q 20/42* (2013.01)
(58) Field of Classification Search
  USPC ................ 705/17, 21, 16, 39; 235/380, 383; 455/413, 41.1
  See application file for complete search history.

(56) References Cited

U.S. PATENT DOCUMENTS

| | | |
|---|---|---|
| 2007/0055630 A1 | 3/2007 | Gauthier et al. |
| 2007/0278290 A1 | 12/2007 | Messerges et al. |
| 2008/0121687 A1 | 5/2008 | Buhot |
| 2008/0126145 A1 | 5/2008 | Rackley, III et al. |
| 2008/0155257 A1 | 6/2008 | Werner et al. |
| 2008/0162312 A1 | 7/2008 | Sklovsky et al. |
| 2008/0167000 A1 | 7/2008 | Wentker et al. |
| 2008/0179395 A1* | 7/2008 | Dixon ................. G06Q 20/027 235/380 |
| 2008/0183589 A1 | 7/2008 | Dixon et al. |
| 2008/0245851 A1 | 10/2008 | Kowalshi |
| 2009/0065571 A1 | 3/2009 | Jain |
| 2009/0191811 A1* | 7/2009 | Griffin ................. G06Q 20/10 455/41.1 |
| 2009/0193500 A1 | 7/2009 | Griffin et al. |
| 2009/0245851 A1 | 10/2009 | Hoshi |
| 2009/0250513 A1* | 10/2009 | Shoemaker ......... G06Q 20/204 235/380 |
| 2010/0063889 A1* | 3/2010 | Proctor, Jr. ........ G06Q 30/0623 705/21 |
| 2010/0063893 A1 | 3/2010 | Townsend |
| 2010/0082481 A1 | 4/2010 | Lin et al. |
| 2011/0068170 A1* | 3/2011 | Lehman ................ G06Q 30/02 235/380 |
| 2011/0112918 A1 | 5/2011 | Mestre et al. |
| 2011/0196783 A1 | 8/2011 | Liwerant |
| 2011/0215159 A1 | 9/2011 | Jain |
| 2011/0218880 A1 | 9/2011 | Hammad |
| 2011/0313922 A1 | 12/2011 | Ayed |
| 2012/0005076 A1 | 1/2012 | Dessert et al. |
| 2012/0011007 A1 | 1/2012 | Blewett et al. |
| 2012/0054046 A1 | 3/2012 | Albisu |
| 2012/0239514 A1 | 9/2012 | MacGillivray et al. |
| 2012/0265685 A1 | 10/2012 | Brudnicki et al. |
| 2012/0296710 A1* | 11/2012 | Dixon ................. G06Q 20/027 705/13 |
| 2013/0144740 A1 | 6/2013 | MacGillivray et al. |
| 2013/0173407 A1 | 7/2013 | Killian |
| 2013/0282438 A1 | 10/2013 | Hunter |
| 2013/0311313 A1 | 11/2013 | Laracey |

FOREIGN PATENT DOCUMENTS

| | | |
|---|---|---|
| WO | 2010039337 | 4/2010 |
| WO | 2012122656 | 9/2012 |

OTHER PUBLICATIONS

European Patent Office. Extended European Search Report issued in EP application 11158747.3, dated Aug. 23, 2011, 6 pages.

International Bureau, "International Search Report and Written Opinion", issued in connection with international application No. PCT/CA2012/050164, dated Jun. 1, 2012, (10 pages).

Office Action issued in Canadian Application No. 2,830,109 dated May 10, 2016.

* cited by examiner

METHODS AND APPARATUS TO OBTAIN TRANSACTION CONFIRMATION

CROSS REFERENCE TO RELATED APPLICATIONS

This patent is a continuation of and claims the benefit of U.S. Non-Provisional application Ser. No. 13/754,497, filed Jan. 30, 2013, which is a continuation of and claims the benefit of U.S. Non-Provisional application Ser. No. 13/050,375, filed on Mar. 17, 2011, which issued as U.S. Pat. No. 8,392,259 on Mar. 5, 2013, the entire contents of which are hereby expressly incorporated by reference herein in their entireties.

FIELD OF THE DISCLOSURE

This disclosure relates generally to wireless transactions and, more particularly, to methods and apparatus to obtain transaction confirmation.

BACKGROUND

Conventionally, wireless payments and transactions result in a separate paper receipt being generated at a point of sale and the paper receipt being handed to the customer. Customers using wireless payment technologies likely have little desire for paper receipts confirming their wireless transactions.

DETAILED DESCRIPTION

Figure 1:
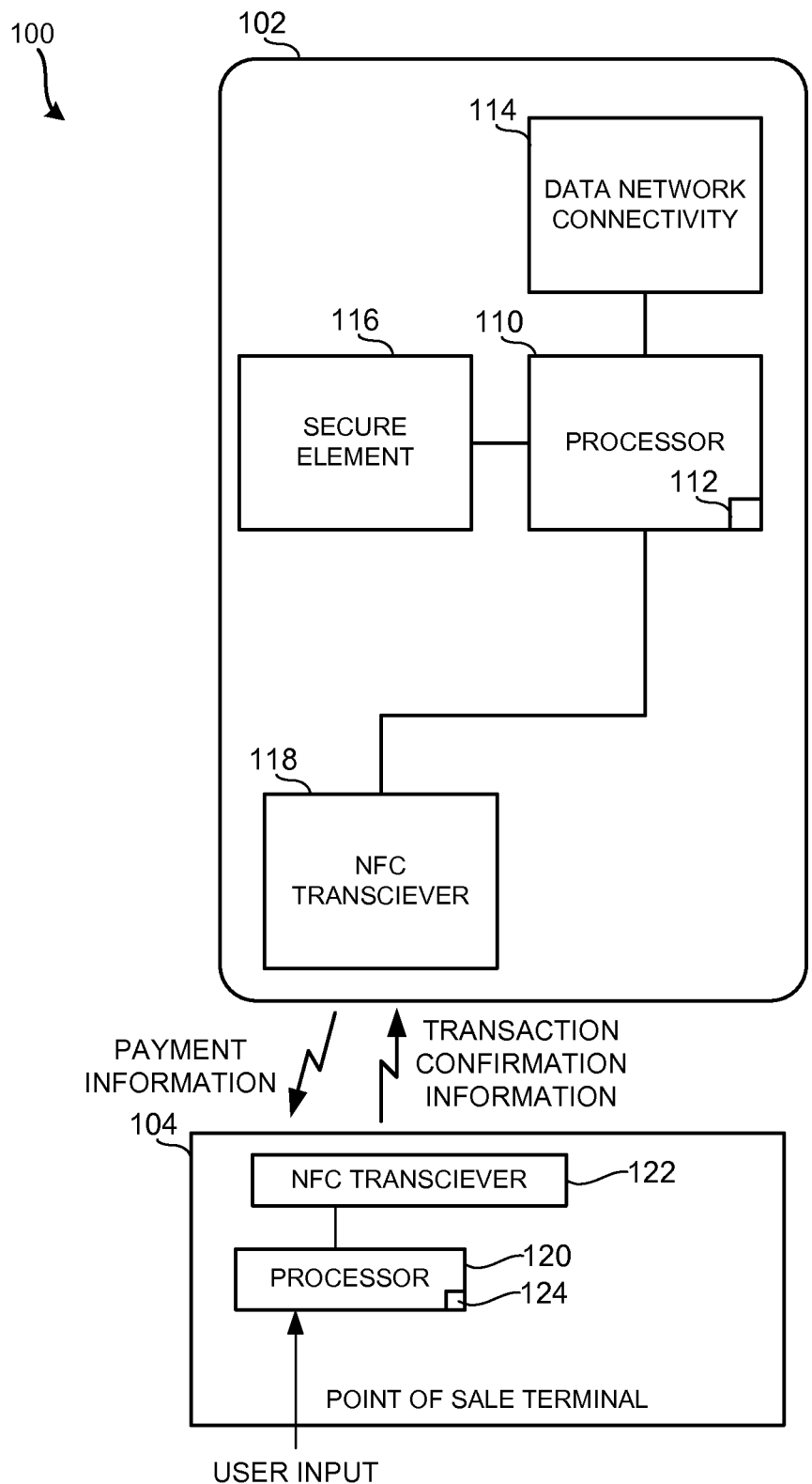
FIG. 1 is a block diagram of an example interaction between a mobile device and a retailer point of sale.

As described below, close-proximity or proximity-based communication systems, such as radio frequency identification (RFID), near-field communication (NFC), and the like, can be used by a mobile device, such as a smartphone, to interoperate with retail point of sale hardware to facilitate a transaction between a consumer (or purchaser) and a retailer. That is, upon indicating to the retailer the goods the consumer desires to purchase, the retailer will inform the consumer of the total price of such goods. The consumer may then use his or her mobile device to transfer payment information to the retailer via the point of sale hardware using close-proximity communications by moving the mobile device within range of the point of sale. The retailer may subsequently verify the validity of the payment information and, if the payment information is valid, consider the goods paid in full. The point of sale may then, either automatically or in response to input from the retailer, issue a transaction confirmation, such as a receipt.

An example method described herein includes emulating a payment method using a close-proximity communication device of a mobile device, establishing a close-proximity communication link using the close-proximity communication device of the mobile device, transferring payment information from the mobile device using the close-proximity communication device, switching the close-proximity communication device of the mobile device to an information receiving communication mode (e.g., a peer-to-peer mode or a reader/writer mode), and receiving a transaction confirmation at the close-proximity communication device of the mobile device.

In an example, the close-proximity communication device of the mobile device is controlled to automatically cycle between an emulation mode and the information receiving communication mode. Thus, transferring payment information and receiving the transaction confirmation are carried out within a single instance of the close-proximity communication device being within range of a point of sale. Alternatively, the switching of the close-proximity communication device of the mobile device to the information receiving communication mode may be carried out after the close-proximity communication device of the mobile device is out of range of a point of sale after transferring payment information from the mobile device using close-proximity communication.

An example mobile device may include a close-proximity communication device and a processor coupled to the close-proximity communication device to cause the close-proximity communication device to carry out a number of tasks. Such tasks may include emulating a payment method, establish a close-proximity communication link with a point of sale, transfer payment information from the mobile device to the point of sale, switch to an information receiving communication mode, and receive a transaction confirmation from the point of sale.

Also described below is a system that may perform a method including entering an information receiving communication mode of a close-proximity communication device at a point of sale, receiving payment information from a mobile device using the close-proximity communication device, switching the close-proximity communication device of the point of sale to an emulation mode, and transferring a transaction confirmation to the mobile device. The method may include determining whether transfer of transaction confirmation is desired and issuing the transaction confirmation if one is desired. An example point of sale device or system may include a close-proximity communication device, a processor coupled to the close-proximity communication device to cause the close-proximity communication device to perform a number of tasks. The tasks may at least include enter an information receiving communication mode of a close-proximity communication device at the point of sale, receive payment information from a mobile device using the close-proximity communication device, switch the close-proximity communication device of the point of sale to an emulation mode, and transfer a transaction confirmation to the mobile device.

Turning to FIG. 1, a system 100 is shown in which a mobile device 102 sends payment information to a point of sale terminal 104, such as a retail point of sale, and receives transaction confirmation information, such as receipt information, from the point of sale terminal 104. As shown in FIG. 1, the exchange of payment information and receipt information between the mobile device 102 and the point of sale terminal 104 may be carried out using NFC, in one example. However, any suitable close-proximity or proximity-based communication technology such as RFID or the like may be used.

The mobile device 102 may comprise a smartphone, a cellular telephone, a tablet computer, a portable computer, a touch pad-based device, or any other suitable device. A relevant portion of the mobile device 102 is shown in FIG. 1, but the mobile device 102 may include other devices or functionality not shown in FIG. 1.

Figure 6:
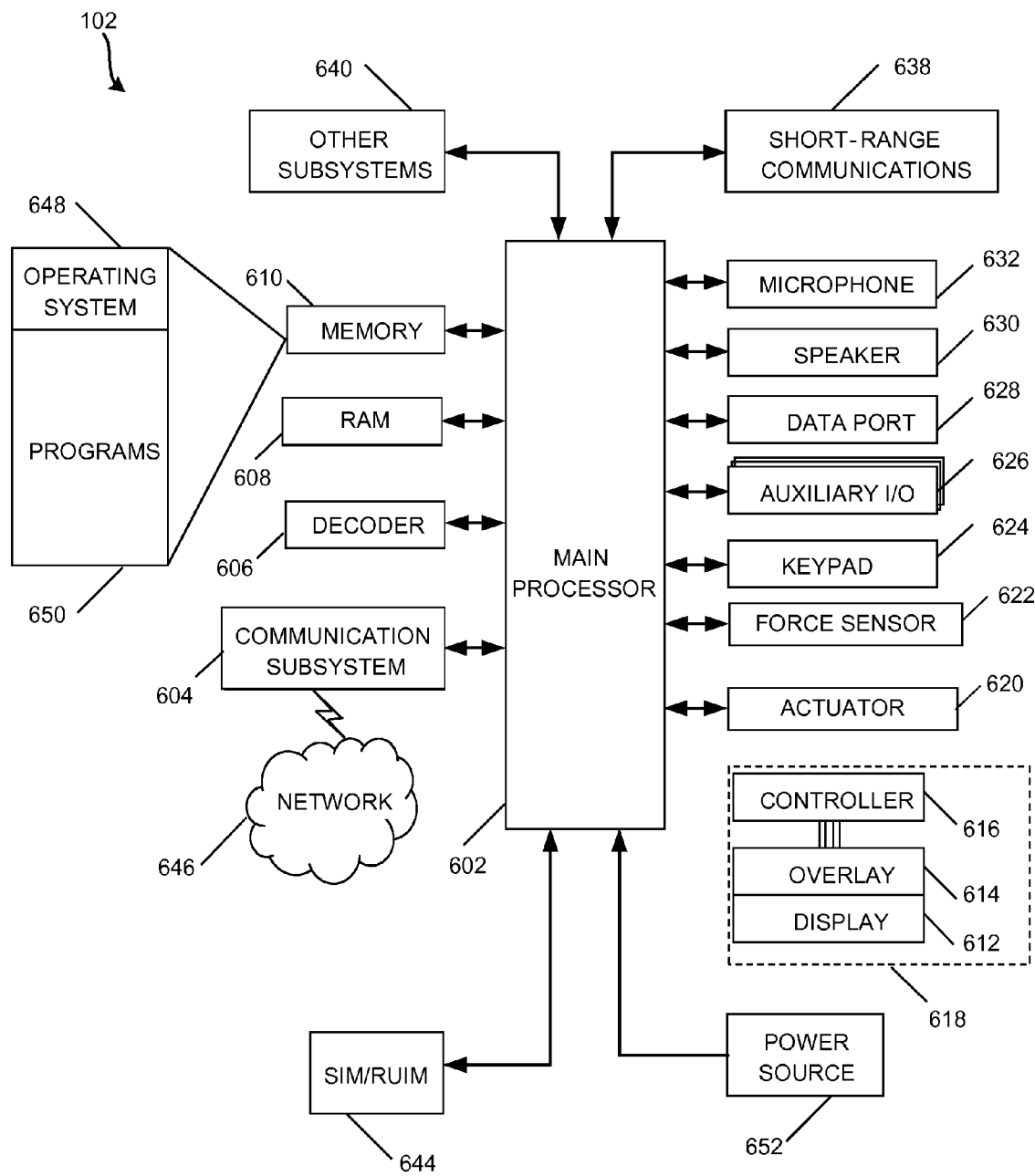
FIG. 6 is a block diagram of an example mobile device in accordance with the disclosure.

In an example, the mobile device 102 includes a processor or controller 110 including instructions stored thereon in a memory 112. The processor 110 may be implemented using any suitable microcontroller or microprocessor capable of executing instructions. Additionally, the processor 102 may include hardware implementations, such as application-specific integrated circuits (ASIC), programmable logic devices (PLDs), or any other suitable logic device or devices. While shown as part of the processor 110 in FIG. 1, the memory 112 may be separate from the processor 110 and may be coupled to the processor 110 via one or more conductive lines. The processor 110 is coupled to data network connectivity 114, a secure element 116, and an NFC transceiver 118, e.g., a close-proximity communication device. Another example of the mobile device 102 is shown in FIG. 6.

The data network connectivity 114 may be implemented using any wireless communication technique. For example, the data network connectivity 114 may be hardware or software, or both, that facilitate connection to a digital cellular network. Additionally or alternatively, the data network connectivity 114 may facilitate communication with 802.xx type networks or any other suitable data networks. Thus, the data network connectivity 114 may provide the cellular and wired fidelity (WIFI) data connectivity that is typically found in smartphones.

The secure element 116 stores information related to payment methods, or any other secure information. For example, the secure element 116 may store information related to credit cards or accounts, debit cards or accounts, customer loyalty cards or accounts, or any other suitable information. The secure element 116 may also store security codes, security keys, or any other suitable information that may be used to facilitate transactions between the mobile device 102 and the point of sale terminal 104.

The NFC transceiver 118 is a close-proximity communication device that may have many modes and that is controllable by the processor 110. In one example, the NFC transceiver 118 may enter a transfer mode to emulate a NFC tag containing specified information. The NFC transceiver 118 may also operate in an information receiving mode or may operate in a NFC reader/writer mode that is configured to interrogate, send commands and information to, and receive information from NFC tags. The NFC transceiver 118 may be implemented in accordance with the International Standards Organization standard ISO 14443. However, other types of close-proximity communication devices may be utilized instead of, or in addition to, the NFC transceiver 118. Additionally, the NFC transceiver 118 need not be used in favor of utilizing different, independent NFC devices. For example, the NFC transceiver 118 may be replaced by one or more active or passive NFC tags and an NFC reader/writer, any or all of which may be coupled to the processor 110.

The point of sale terminal 104 may include any number of components such as cash register, a display screen, etc., but, in the example of FIG. 1, the point of sale terminal 104 includes at least a processor 120 and a NFC transceiver 122.

The processor 120, which is capable of receiving a user input, may include stored instructions in a memory 124, or the instructions may be stored in an alternate memory separate from the processor 120. The processor 120 may be implemented using any suitable microcontroller or microprocessor capable of executing instructions. Additionally, the processor 120 may include hardware implementations, such as ASICs, PLDs, or any other suitable logic device or devices. The processor 120 may be a stand-alone device, or may be implemented as part of a larger device. For example, in the context of a computer-based cash register, the functionality of the processor 120 may be implemented as part of the processor performing the cash register functionality. In an example, a portion of the point of sale terminal 104 may be implemented using the hardware of FIG. 7.

The NFC transceiver 122, similar to the NFC transceiver 118 described above, may be implemented using a close-proximity communication device having different modes of operation, such as a tag emulation mode, a peer-to-peer mode, and a NFC reader/writer mode. Additionally, the NFC transceiver 122 may be replaced with one or more NFC tags (passive or active NFC tags), a NFC reader/writer, or any other suitable components.

As described below in conjunction with processes carried out by the mobile device 102 and the point of sale terminal 104, when payment is due, the point of sale terminal 104 receives payment information from the mobile device 102. When the payment information is being transferred, the NFC transceiver 118 emulates a NFC tag and the NFC transceiver 122 operates as a NFC reader/writer. In combination, the NFC transceiver 118 and the NFC transceiver 122 transfer payment information from the secure element 116 to the point of sale terminal 104 (i.e. the point of sale terminal 104 may read the payment information from the mobile device 102). After the payment information has been received, the NFC transceiver 122 enters a transfer mode and emulates a NFC tag having transaction confirmation information stored therein and the NFC controller 118 operates as a NFC reader/writer to obtain the transaction confirmation information (i.e. the mobile device 102 may read the transaction confirmation information from the point of sale 104). Alternatively, the NFC transceiver 122 may enter a peer-to-peer mode.

Figure 7:
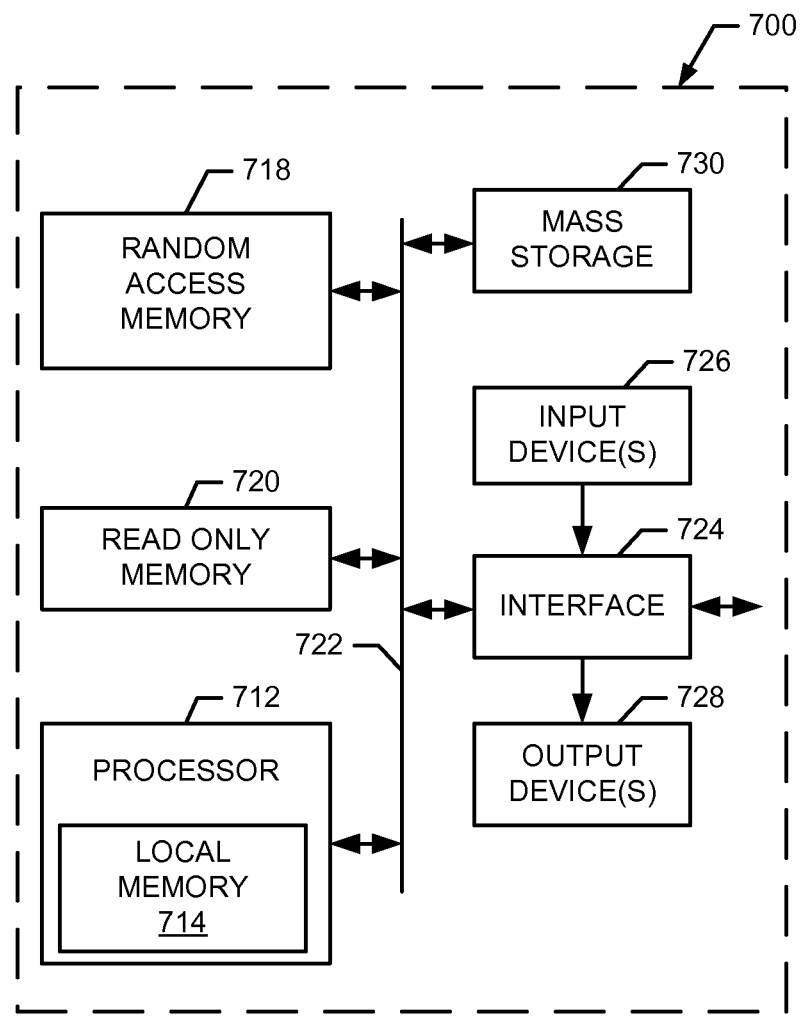
FIG. 7 is a block diagram of example hardware that may be used to implement the retailer point of sale block diagrams and processes described above.

Flowcharts representative of example processes that may be executed to implement some or all of the elements and devices described herein are described below and shown in the drawings. In these examples, the process represented by each flowchart may be implemented by one or more programs comprising machine readable instructions for execution by a processor or controller or any suitable hardware, such as shown in FIG. 1, FIG. 6, FIG. 7, or any other suitable device.

The one or more programs may be embodied in software or software instructions stored on a tangible medium such as, for example, a flash memory, a CD-ROM, a hard drive, a DVD, or a memory associated with a processor, but the entire program or programs and/or portions thereof could alternatively be executed by a device other than the microprocessor and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts may be implemented manually. As used herein, the term tangible computer readable medium is expressly defined to include any type of computer readable storage.

Additionally or alternatively, the example processes described herein may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium.

Figure 2:
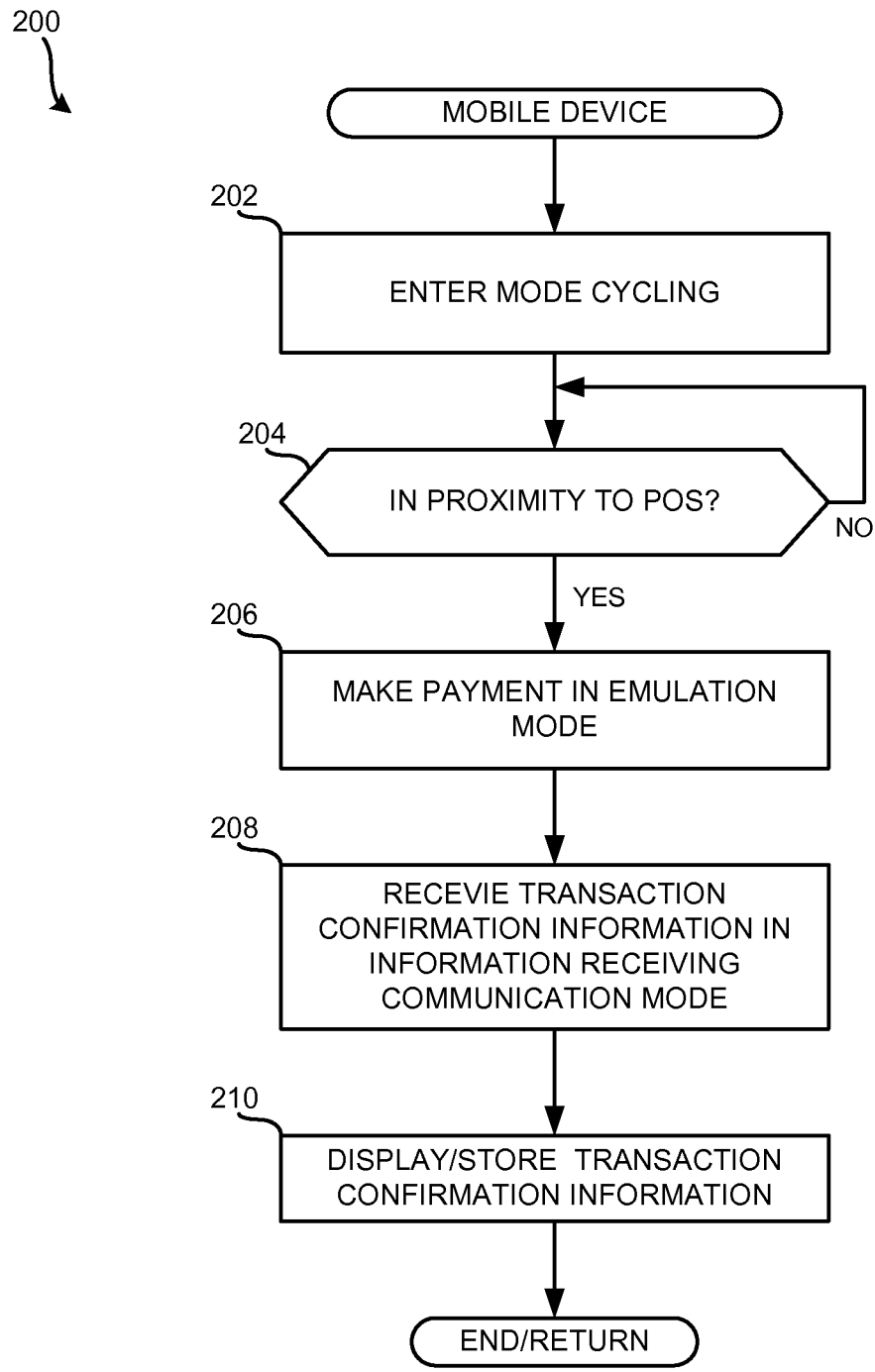
FIG. 2 is a flow diagram of an example process that may be carried out by the mobile device of FIG. 1 to facilitate a transaction between the mobile device and the retailer point of sale in accordance with a first example.
Figure 3:
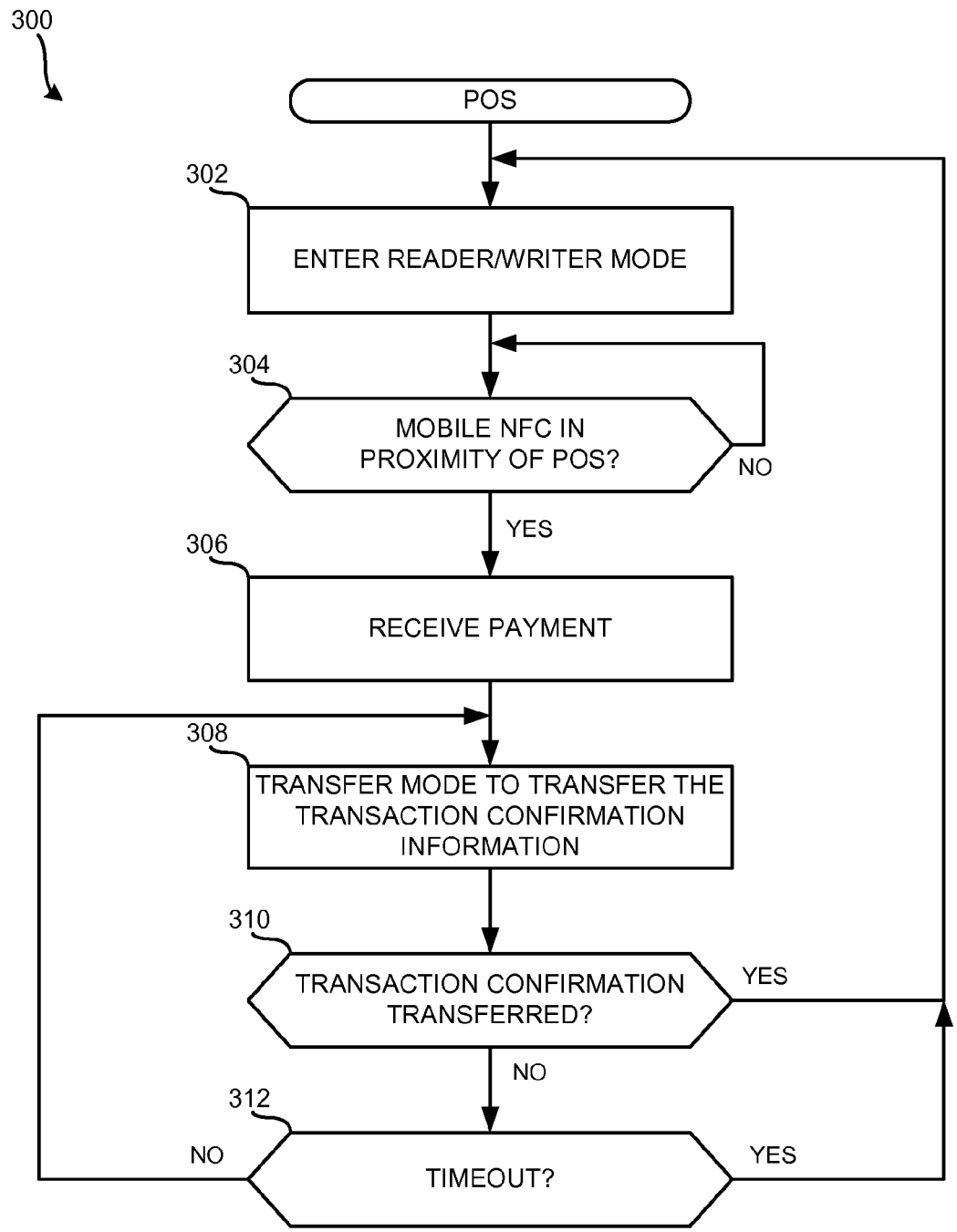
FIG. 3 is a flow diagram of an example process that may be carried out by the retailer point of sale of FIG. 1 to facilitate a transaction between the mobile device and the retailer point of sale in accordance with the first example.

The processes of FIGS. 2 and 3 operate together, one on the mobile device 102 and one on the retail point of sale (POS) 104, to facilitate a payment and transaction confirmation information exchange within a single instance of the close-proximity communication device (e.g., the NFC transceiver 118) of the mobile device 102 being within range of the retail point of sale NFC transceiver 122.

A process 200, as shown in FIG. 2, may be carried out by a mobile device, such as the mobile device 102 of FIG. 1. For example, instructions implementing some or all of the process 200 of FIG. 2 may be stored in the memory 112 and executed by the processor 110. The mobile device 102 enters mode cycling wherein the processor 110 and the NFC transceiver 118 cooperate to cause the mode of the NFC transceiver to cycle between (1) an emulation mode during which the NFC transceiver 118 emulates a payment method or a peer-to-peer mode and (2) an information receiving communication mode, such as a NFC read/write mode or a peer-to-peer mode during which information can be read by the NFC transceiver 118 (block 202). During the mode cycling, the NFC transceiver 118 may automatically cycle between the emulation and information receiving communication modes. The mobile device 102 waits until it is in proximity of the point of sale terminal 104 (block 204) and, when the mobile device 102 is within proximity of the point of sale terminal 104, payment is made by the NFC transceiver 118 operating in emulation mode (block 206). The payment may be made in response to a read/write signal or any suitable interrogation signal transmitted from the NFC transceiver 122 (the corresponding operation of which is described below). Because the NFC transceiver 118 is still mode cycling between emulation and information receiving communication modes, the NFC transceiver 118, while the mobile device 102 is still proximate the point of sale terminal 104 after payment (block 206), will transition into an information receiving communication mode, such as a reader/writer mode, at which time the NFC transceiver 118 will receive the transaction confirmation information, which may take the form of a receipt (block 208). After the transaction confirmation information is received, it may be displayed to the user on the mobile device 102 display screen or stored in the mobile device 102, or both.

Operation of the point of sale terminal 104 corresponding to the operation of the mobile device 102 described above is shown in FIG. 3 as a process 300. Instructions implementing some or all of the process 300 of FIG. 3 may be stored in the memory 124 and executed by the processor 120. The processor 120 and the NFC transceiver 122 cooperate to put the NFC transceiver 122 in reader/writer mode (block 302). In the reader/writer mode, the NFC transceiver 122 is capable of reading information from NFC tags or from NFC transceivers (e.g., the NFC transceiver 118) that are emulating NFC tags. When the NFC transceiver 118 of the mobile device 102 is in proximity of the point of sale terminal 104 (block 304), the NFC transceiver 122 reads the NFC transceiver 118, which is emulating a NFC tag with payment information and payment is received (block 306).

After the payment is received (block 306), the NFC transceiver 122 enters a transfer mode to transfers the transaction confirmation (block 308). For example, when entering the transfer mode the NFC transceiver 122 may emulate a NFC tag having the transaction confirmation information stored thereon such that when the NFC transceiver 118 cycles into the information receiving communication mode (block 208, above), the NFC transceiver 118 reads the NFC transceiver 122. In another example, the NFC transceiver 122 may enter a peer-to-peer mode to transfer the transaction confirmation information. When the transaction confirmation has been transferred (block 310) or a timeout has occurred (block 312), the NFC transceiver 122 returns to the reader/writer mode to await the next payment transaction (block 302). If the transaction confirmation has not been transferred (block 310) and a timeout has not occurred (block 312), the NFC transceiver 122 may remain in emulation mode, ready to transfer the transaction confirmation (block 308).

Figure 4:
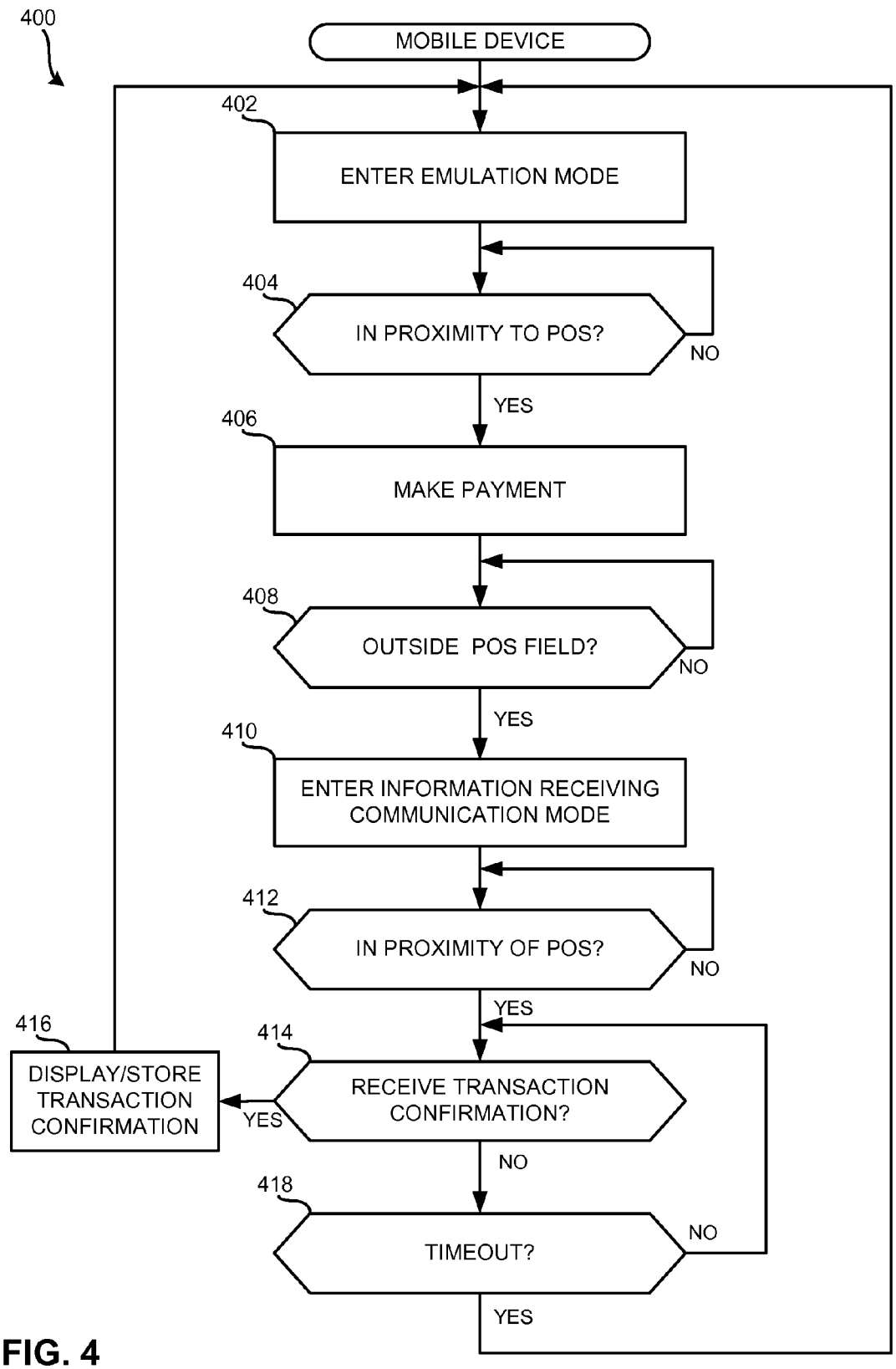
FIG. 4 is a flow diagram of an example process that may be carried out by the mobile device of FIG. 1 to facilitate a transaction between the mobile device and the retailer point of sale in accordance with a second example.
Figure 5:
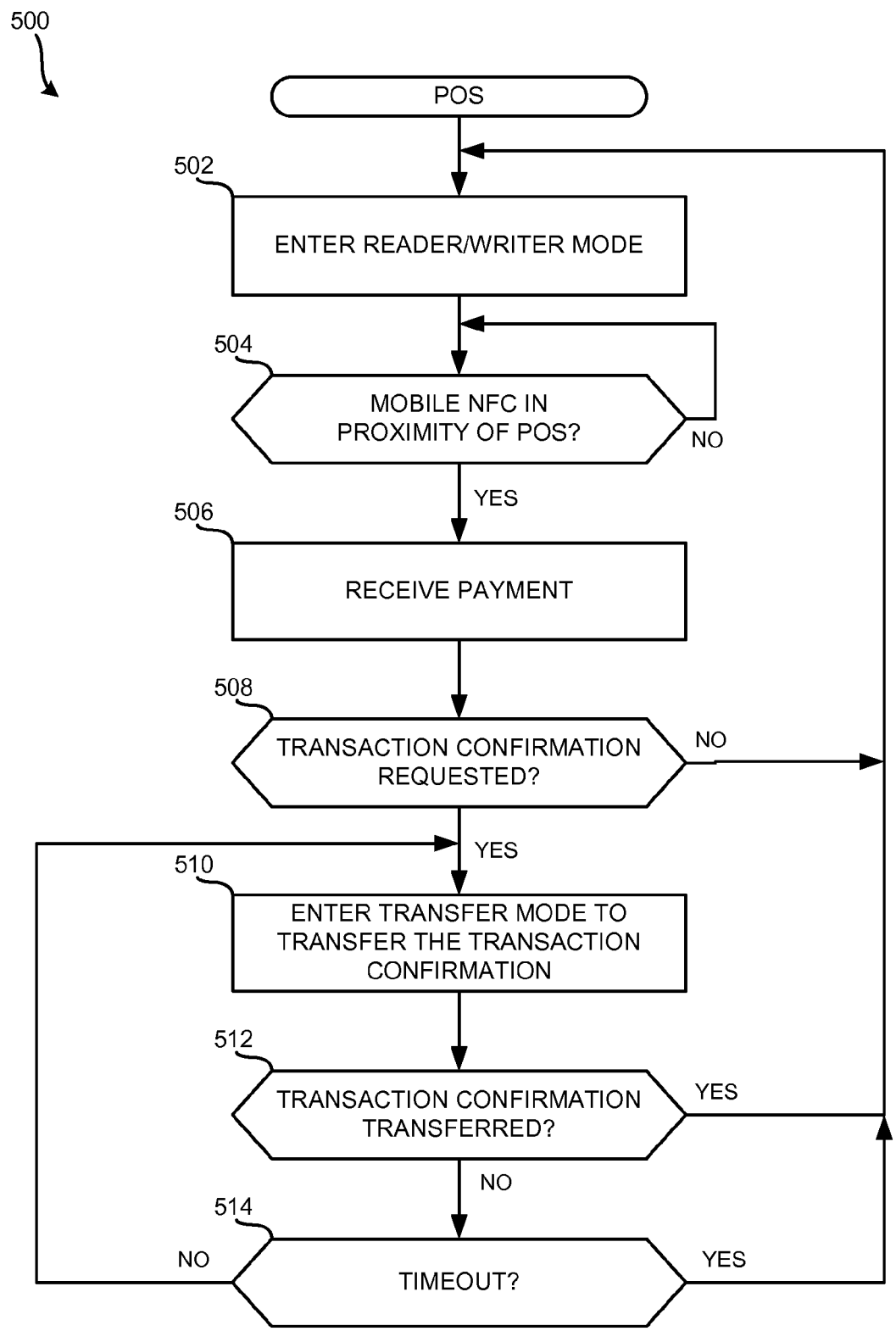
FIG. 5 is a flow diagram of an example process that may be carried out by the retailer point of sale of FIG. 1 to facilitate a transaction between the mobile device and the retailer point of sale in accordance with the second example.

The processes of FIGS. 4 and 5 operate together, one on the mobile device 102 and one on the retail point of sale (POS) 104, to facilitate a payment and transaction confirmation information exchange, wherein after payment the mobile device 102 is removed from proximity of the point of sale terminal 104 before it is again placed within proximity of the point of sale terminal 104 to receive the transaction confirmation information. Thus, the mobile device 102 is brought in proximity of the point of sale terminal 104 two times, once to make payment and once to receive the transaction confirmation information.

According to the process 400 of FIG. 4, the mobile device 102 enters an emulation mode (block 402) during which the NFC transceiver 118 can transfer payment information from the secure element 116. In an alternative, the mobile device 102 may enter a peer-to-peer mode. When the mobile device 102 and, more particularly, the NFC transceiver 118, are in proximity to the point of sale terminal 104 (block 404), payment is made by transferring information from the secure element 116 via the NFC transceiver 118 to the NFC transceiver 122 (block 406).

The user may then move the mobile device 102 out of proximity of the point of sale terminal 104 (block 408), at which point the NFC transceiver 118 of the mobile device 102 enters an information receiving communication mode, such as a reader/writer mode or a peer-to-peer mode (block 410). After the mobile device 102 is in proximity of the point of sale terminal 104 (block 412), the transaction confirmation information may be received (block 414). The received transaction confirmation information may be displayed and stored (blocks 416). In one example, the received transaction confirmation may be stored at one point in time and displayed at a later point in time at user direction. Alternatively, if the transaction confirmation information is not received, a timeout may occur (block 418). If the transaction confirmation is received and displayed or stored (block 416) or a timeout occurs (block 418), the NFC transceiver 118 of the mobile device 102 returns to emulation mode (block 402). Instructions implementing some or all of the process 400 of FIG. 4 may be stored in the memory 112 and executed by the processor 110.

Operation of the point of sale terminal 104 corresponding to the operation of the mobile device 102 described above in conjunction with FIG. 4 is shown in FIG. 5 as a process 500. Instructions implementing some or all of the process 500 of FIG. 5 may be stored in the memory 124 and executed by the processor 120. The processor 120 and the NFC transceiver 122 cooperate to put the NFC transceiver 122 in reader/writer mode (block 502). In the reader/writer mode, the NFC transceiver 122 is capable of reading information from NFC tags or from NFC transceivers (e.g., the NFC transceiver 118) that are emulating NFC tags. When the NFC transceiver 118 of the mobile device 102 is in proximity of the point of sale terminal 104 (block 504), the NFC transceiver 122 reads the NFC transceiver 118, which is emulating a NFC tag with payment information and payment is received (block 506).

After the payment is received (block 506), the process point of sale terminal 104 determines whether a transaction confirmation (e.g. a receipt) is requested (block 508). The determination of whether a transaction confirmation is requested may be made by user input to the processor 120 of the point of sale terminal 104, or an indication may be received from the mobile device 102. For example, user input may include a merchant selecting a key that informs the point of sale terminal 104 that a transaction confirmation is requested or desired by the customer. If no transaction confirmation is requested (block 508), the retail point of sale remains in the reader/writer mode (block 502).

If a transaction confirmation is requested (block 508), the NFC transceiver 122 enters a transfer mode and emulates the transaction confirmation (block 510). For example, the NFC transceiver 122 may emulate a NFC tag having the transaction confirmation information stored thereon such that when the NFC transceiver 118 enters into the information receiving communication mode (block 410, above), the NFC transceiver 118 reads the NFC transceiver 122. In another example, the NFC transceiver 122 may enter a peer-to-peer mode to send the transaction confirmation information. When the transaction confirmation has been transferred (block 512) or a timeout has occurred (block 514), the NFC transceiver 122 returns to the reader/writer mode to await the next payment transaction (block 302). If the transaction confirmation has not been transferred (block 512) and a timeout has not occurred (block 514), the NFC transceiver 122 remains in emulation mode, ready to transfer the transaction confirmation (block 510).

A block diagram of an example mobile device 102, which may be carry out the processes of FIG. 2 and/or FIG. 4, is shown in FIG. 6. The mobile device 102 includes multiple components, such as a processor 602 that controls the overall operation of the mobile device 102. Communication functions, including data and voice communications, are performed through a communication subsystem 604. Data received by the mobile device 102 is decompressed and decrypted by a decoder 606. The communication subsystem 604 receives messages from and sends messages to a wireless network 646. The wireless network 646 may be any type of wireless network, including, but not limited to, data wireless networks, voice wireless networks, and networks that support both voice and data communications. A power source 652, such as one or more rechargeable batteries or a port to an external power supply, powers the mobile device 102.

The processor 602 interacts with other components, such as Random Access Memory (RAM) 608, memory 610, a display 612 with a touch-sensitive overlay 614 operably connected to an electronic controller 616 that together comprise a touch-sensitive display 618, one or more actuator apparatus 620, one or more force sensors 622, a keypad 624, an auxiliary input/output (I/O) subsystem 626, a data port 628, a speaker 630, a microphone 632, short-range communications 638, and other device subsystems 640. User-interaction with a graphical user interface is performed through the touch-sensitive display 618. The processor 602 interacts with the touch-sensitive overlay 614 via the electronic controller 616. Information, such as text, characters, symbols, images, icons, and other items that may be displayed or rendered on the mobile device 102, is displayed on the touch-sensitive display 618 via the processor 602. In some examples, the display 612 may include a primary display and a secondary display.

To identify a subscriber for network access, the mobile device 102 uses a Subscriber Identity Module or a Removable User Identity Module (SIM/RUIM) card 644 for communication with a network, such as the wireless network 646. Alternatively, user identification information may be programmed into memory 610.

The mobile device 102 includes an operating system 648 and software programs or components 650 that are executed by the processor 602 to implement various applications and instructions to carry out processes described herein and are typically stored in a persistent, updatable store such as the memory 610. Additional applications or programs may be loaded onto the portable electronic device 102 through the wireless network 646, the auxiliary I/O subsystem 626, the data port 628, the short-range communications subsystem 638, or any other suitable subsystem 640.

A received signal such as a text message, an e-mail message, or web page download is processed by the communication subsystem 604 and input to the processor 602. The processor 602 processes the received signal for output to the display 612 and/or to the auxiliary I/O subsystem 626. A subscriber may generate data items, for example e-mail messages, which may be transmitted over the wireless network 646 through the communication subsystem 604. For voice communications, the overall operation of the mobile device 102 is similar. The speaker 630 outputs audible information converted from electrical signals, and the microphone 632 converts audible information into electrical signals for processing.

The short-range communications 638 functionality may be NFC, RFID, or any other suitable short-range or close-proximity communication technology. As described herein, the short-range communications 638 may be used to facilitate transactions with a retail point of sale.

FIG. 7 is a block diagram of an example processing system 700 capable of implementing the apparatus and methods disclosed herein. The processing system 700 can correspond to, for example, a mobile device, a retail point of sale, or any other type of computing device.

The system 700 of the instant example includes a processor 712 such as a general purpose programmable processor, an embedded processor, a microcontroller, etc. The processor 712 includes a local memory 714, and executes coded instructions present in the local memory 714 and/or in another memory device. The processor 712 may execute, among other things, machine readable instructions to implement any, some or all of the processes represented in FIGS. 3 and 5. The processor 712 may be any type of processing unit, such as one or more microprocessors, one or more microcontrollers, etc. Of course, other processors are also appropriate.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The system 700 also includes an interface circuit 724. The interface circuit 724 may be implemented by any type of interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, an isopoint and/or a voice recognition system.

One or more output devices 728 are also connected to the interface circuit 724. The output devices 728 can be implemented, for example, by display devices (e.g., a liquid crystal display), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The system 700 also includes one or more mass storage devices 730 for storing software and data. Examples of such mass storage devices 730 include hard drive disks, compact disk drives and digital versatile disk (DVD) drives.

As an alternative to implementing the methods and/or apparatus described herein in a system such as shown in FIG. 7, the methods and or apparatus described herein may be embedded in a structure such as a processor and/or an ASIC (application specific integrated circuit).

Further, although the example processes are described with reference to flowcharts, many other techniques for implementing the example methods and apparatus described herein may alternatively be used. For example, with reference to the flowcharts, the order of execution of the blocks may be changed, and/or some of the blocks described may be changed, eliminated, combined, and/or subdivided into multiple blocks. Any of the described blocks may be as implemented as part of an existing system. While the example block diagrams are described as implementing the processes of the flowcharts, the apparatus of the block diagrams may implement any process and, likewise, the processes of the flowcharts may be implemented by any apparatus, device, system, software, or combination thereof.

Finally, although certain example methods, apparatus and articles of manufacture have been described herein, the scope of coverage of this disclosure is not limited thereto. On the contrary, this disclosure covers all methods, apparatus and articles of manufacture and equivalents described and claimed herein.

What is claimed is:

1. A method comprising:
   emulating a payment method using a close-proximity communication device of a mobile device, wherein the close-proximity communication device includes a near-field communication (NFC) transceiver, and the NFC transceiver automatically cycles between an emulation mode and an information receiving communication mode;
   establishing a close-proximity communication link using the close-proximity communication device of the mobile device;
   transferring payment information from the mobile device to a point of sale terminal using the emulation mode of the NFC transceiver of the close-proximity communication device; and
   receiving, at the close-proximity communication device of the mobile device, a transaction confirmation from the point of sale terminal using the information receiving communication mode of the NFC transceiver of the close-proximity communication device, the transferring of the payment information and the receiving of the transaction confirmation being carried out within a single instance of the close-proximity communication device of the mobile device being within range of a close-proximity communication device of the point of sale terminal.

2. The method of claim 1, wherein the NFC transceiver automatically cycles between the emulation mode and the information receiving communication mode during the single instance of the close-proximity communication device of the mobile device being within range of the close-proximity communication device of the point of sale terminal.

3. The method of claim 2, wherein the close-proximity communication link is established when the close-proximity communication device is in the emulation mode.

4. The method of claim 1, wherein the information receiving communication mode comprises a peer-to-peer communication mode.

5. The method of claim 1, wherein the close-proximity communication link comprises a near-field communication (NFC) link.

6. The method of claim 1, wherein the transaction confirmation comprises a receipt.

7. The method of claim 6, further comprising displaying the receipt on the mobile device.

8. The method of claim 1, wherein the payment method comprises a credit card.

9. A mobile device comprising:
   a close-proximity communication device, wherein the close-proximity communication device includes a near-field communication (NFC) transceiver, and the NFC transceiver automatically cycles between an emulation mode and an information receiving communication mode;
   a processor coupled with the close-proximity communication device, the processor being configured to cause the close-proximity communication device to:
      emulate a payment method;
      establish a close-proximity communication link with a point of sale terminal;

transfer payment information from the mobile device to the point of sale terminal using the emulation mode of the NFC transceiver; and receive a transaction confirmation from the point of sale terminal using the information receiving communication mode of the NFC transceiver, transferring the payment information and receiving the transaction confirmation to be carried out within a single instance of the close-proximity communication device of the mobile device being within range of a close-proximity communication device of the point of sale terminal.

10. The mobile device of claim 9, wherein the NFC transceiver automatically cycles between the emulation mode and the information receiving communication mode during the single instance of the close-proximity communication device of the mobile device being within range of the close-proximity communication device of the point of sale terminal.

11. The mobile device of claim 9, wherein the information receiving communication mode comprises a peer-to-peer communication mode.

12. The mobile device of claim 9, wherein the close-proximity communication device comprises a near-field communication (NFC) device.

13. The mobile device of claim 9, wherein the transaction confirmation comprises a receipt.

14. The mobile device of claim 13, further comprising a display coupled with the processor, wherein the processor is further configured to cause the receipt to be presented on the display of the mobile device.

* * * * *